(12) United States Patent
Mueller et al.

(10) Patent No.: US 7,348,052 B2
(45) Date of Patent: Mar. 25, 2008

(54) SANDWICH WRAPPERS, FAST FOOD WRAPPERS, AND GUM WRAPPERS COMPRISING PLA RESIN

(75) Inventors: LouAnn S. Mueller, Little Chute, WI (US); William R. Arndt, Hilbert, WI (US)

(73) Assignee: Coating Excellence International, Wrightstown, WI (US)

( * ) Notice: Subject to any disclaimer, the term of this patent is extended or adjusted under 35 U.S.C. 154(b) by 445 days.

(21) Appl. No.: 10/430,227

(22) Filed: May 5, 2003

(65) Prior Publication Data

US 2003/0211348 A1 Nov. 13, 2003

Related U.S. Application Data

(60) Provisional application No. 60/378,380, filed on May 7, 2002.

(51) Int. Cl.
- B32B 27/10 (2006.01)
- B32B 27/36 (2006.01)
- B32B 37/00 (2006.01)

(52) U.S. Cl. ............ 428/219; 428/340; 428/480; 428/481; 428/537.5; 156/297; 156/299; 156/302

(58) Field of Classification Search ............... 428/480, 428/481; 156/244.11, 244.24; 427/407.1; 264/173.16
See application file for complete search history.

(56) References Cited

U.S. PATENT DOCUMENTS

| | | | |
|---|---|---|---|
| 2,140,748 A * | 12/1938 | Johanson | 229/87.07 |
| 2,201,956 A * | 5/1940 | Little | 426/123 |
| 4,006,577 A * | 2/1977 | Schoppee | 53/171 |
| 4,082,594 A * | 4/1978 | Stonehouse | 156/253 |
| 4,795,648 A * | 1/1989 | Capy et al. | 426/111 |
| 5,048,260 A * | 9/1991 | Raymond et al. | 53/370.8 |
| 5,128,182 A | 7/1992 | Bunker et al. | |
| 5,362,500 A | 11/1994 | Mazurek et al. | |
| 5,376,388 A | 12/1994 | Meyers | |
| 5,434,004 A * | 7/1995 | Ajioka et al. | 428/411.1 |
| 5,458,933 A * | 10/1995 | Suskind | 428/34.2 |
| 5,480,693 A | 1/1996 | Patterson et al. | |
| 5,510,124 A * | 4/1996 | Kopecky et al. | 426/5 |
| 5,528,674 A | 6/1996 | Reiss, III | |
| 5,540,962 A | 7/1996 | Suskind | |
| 5,594,095 A * | 1/1997 | Gruber et al. | 528/354 |
| 5,631,066 A * | 5/1997 | O'Brien | 428/195.1 |
| 5,665,474 A | 9/1997 | Gruber et al. | |
| 5,679,421 A * | 10/1997 | Brinton, Jr. | 428/34.3 |
| 5,736,204 A | 4/1998 | Suskind | |
| 5,772,819 A * | 6/1998 | Olvey | 156/82 |
| 5,783,266 A * | 7/1998 | Gehrke | 428/34.3 |
| 5,807,973 A | 9/1998 | Gruber et al. | |
| 5,834,582 A * | 11/1998 | Sinclair et al. | 528/354 |
| 5,849,374 A * | 12/1998 | Gruber et al. | 428/34.3 |
| 5,849,401 A * | 12/1998 | El-Afandi et al. | 428/215 |
| 5,852,166 A | 12/1998 | Gruber et al. | |
| 5,858,487 A | 1/1999 | Boehler et al. | |
| 5,912,070 A * | 6/1999 | Miharu et al. | 428/214 |

(Continued)

FOREIGN PATENT DOCUMENTS

WO WO 01/30889 * 5/2001

*Primary Examiner*—Vivian Chen
(74) *Attorney, Agent, or Firm*—Duane Morris LLP

(57) ABSTRACT

A composite wrap material includes a layer of polyactide (PLA) resin interposed between two layers of cellulosic material.

6 Claims, 1 Drawing Sheet

U.S. PATENT DOCUMENTS

| | | |
|---|---|---|
| 5,925,726 A | 7/1999 | Seppala et al. |
| 5,936,045 A | 8/1999 | Warzelhan et al. |
| 6,010,724 A | 1/2000 | Boyd et al. |
| 6,030,477 A * | 2/2000 | Olvey .......................... 156/82 |
| 6,075,118 A | 6/2000 | Wang et al. |
| 6,080,478 A * | 6/2000 | Karhuketo .................. 428/340 |
| 6,093,791 A | 7/2000 | Gruber et al. |
| 6,103,809 A | 8/2000 | Ahmed et al. |
| 6,114,042 A | 9/2000 | Warzelhan et al. |
| 6,114,495 A | 9/2000 | Kolstad et al. |
| 6,153,306 A * | 11/2000 | Selin et al. ................. 428/481 |
| 6,183,814 B1 * | 2/2001 | Nangeroni et al. ......... 427/361 |
| 6,197,380 B1 | 3/2001 | Gruber et al. |
| 6,291,597 B1 | 9/2001 | Gruber et al. |
| 6,312,823 B1 * | 11/2001 | El-Afandi et al. .......... 428/480 |
| 6,401,390 B1 * | 6/2002 | Labbe et al. ..................... 49/9 |
| 6,559,244 B1 * | 5/2003 | Sodergard et al. .......... 525/420 |
| 6,645,584 B1 * | 11/2003 | Kuusipalo et al. ......... 428/34.2 |
| 6,713,175 B1 * | 3/2004 | Terada et al. ............... 428/349 |
| 6,776,288 B2 * | 8/2004 | Kopecky .................... 206/538 |
| 6,926,951 B2 * | 8/2005 | Huffer et al. ............... 428/204 |
| 2001/0046593 A1 * | 11/2001 | Leavy et al. ................ 428/198 |

* cited by examiner

SANDWICH WRAPPERS, FAST FOOD WRAPPERS, AND GUM WRAPPERS COMPRISING PLA RESIN

RELATED APPLICATIONS

The present application is based on provisional patent application No. 60/378,380 filed May 7, 2002.

FIELD OF THE INVENTION

The present invention relates to the use of PLA for sandwich wrappers, fast food wrappers, and gum wrappers.

BACKGROUND OF THE INVENTION

Typical fast food, burger, and sandwich wrappers are manufactured as a two-or three-layered laminated structure comprising one or two layers of a paper substrate and a layer of polyethylene. In the three-layer structure, two paper substrates are laminated using a layer of polyethylene interposed thereinbetween. In the two-layer structure, one layer of paper substrate is coated with a layer of polyethylene or polymer resin. The poly layer provides protection against moisture and condensation and retains the aroma and flavor of the wrapped food product.

Chewing gum during storage or exposure to ambient conditions, has a tendency to lose or gain moisture from the surrounding atmosphere. This tendency can be dependent upon the ambient temperature, relative humidity, and the packaging used to house the chewing gum. The packaging of the chewing gum is important in keeping the product clean and reducing the tendency of the chewing gum to lose and gain moisture. The packaging is also important to reduce the flavor loss, reduce oxidation, and/or to prevent the product from picking up foreign aromas.

When chewing gum is placed in storage for a period of time, it is gradually exposed to the atmosphere as oxygen and other atmospheric components migrate through the packaging material and into the chewing gum. Over time, this exposure to the atmosphere causes chewing gum flavor to oxidize and develop undesirable sensory characteristics. Mint oils in chewing gums is of particular concern. Also, oxidation of stick chewing gum components is a particular problem due to the high amount of exposed surface area.

Sugar containing chewing gums have a tendency to dry out and become brittle when stored under relatively dry conditions. This is apparent at higher ambient temperatures. Sugarless chewing gums contain lower amounts of moisture than sugar containing gums. In sugarless gums which are sweetened with moisture-susceptible artificial sweeteners, it is important to maintain a low moisture content in order to prevent loss of sweetness and flavor qualities. However, due to their low initial moisture content and higher level of hygroscopic ingredients, these sugarless gums tend to gain moisture above 40% humidity, causing wetness of the chewing gum and degradation of the moisture-susceptible ingredients.

Various techniques have been developed for protecting chewing gum from moisture loss, moisture gain, and other adverse changes which result from storage. It is known to package pieces of chewing gum in a wrapper that comprises a composite material having a tissue or paper substrate that contacts the chewing gum. This wrapper may also have an outer metal/foil surface. The paper substrate may be laminated to a metal/foil structure using polyethylene or other polymer resin. The poly acts as a barrier to oxygen and moisture, both of which reduce the flavor and aroma of the wrapped gum product. A second paper wrapper is then placed around the first wrapper to secure the packaging. This second wrapper displays the gum type and company logo, but may also be plain white.

Double wrapped sticks of chewing gum are housed as a group of individually wrapped gum pieces in a package referred to as a counterband. A counterband is usually also a composite material, such as, an interlayer of aluminum foil with a paper and/or propylene outer surface. A counterband seals the individually wrapped pieces of chewing gum until opened by the customer.

A further issue is environmental concerns. Foil wrappers and counterbands are not biodegradable, easily recyclable and not environmentally friendly.

U.S. Pat. No. 6,010,724 relates to a wrapper for housing chewing gum. The wrapper includes a substrate having a front and back surface. The front surface includes a top edge, a first side edge, a bottom edge, a second side edge, and three areas of adhesive. A first area of adhesive is located along a portion of the front surface that is adjacent to the first edge and the top edge. A third area of adhesive is located along a portion of the front surface that is adjacent to the second side edge and the top edge. And a second edge of adhesive is located along a portion of the front surface that is in juxtaposition to, but not touching, the bottom edge.

U.S. Pat. No. 5,376,388 relates to a method for packaging at least one stick of chewing gum which comprises the steps of preparing a stick of chewing gum that includes a coating of an edible material that provides sufficient vapor barrier properties to provide the stick of chewing gum with a more stable moisture content at ambient conditions than a stick of chewing gum that does not include the coating, and wrapping the stick of chewing gum in a wrapper that does not include any metal foil material to create a wrapped stick of chewing gum. The sticks of chewing gum can then be packaged in a counterband.

U.S. Pat. No. 5,362,500 relates to a method of stabilizing chewing gum with an antioxidant containing tissue and product thereof. A wax-coated tissue paper having free antioxidant present in the wax and having coatings of wax with antioxidant on both surfaces of the tissue paper, retards oxidation and prolongs the life of a chewing gum stick which is individually wrapped with the coated tissue paper.

For hot sandwiches it is difficult to provide a suitable, but inexpensive and ecologically sound environment for maintaining hot sandwiches in palatable condition for the storage interval between preparation and consumption. Styrofoam clamshells have been used, but they require too much volume in landfill, is not at all biodegradable and is quite difficult to economically recycle. They provide only limited storage space.

Composite sandwich wraps are considerably more effective in controlling moisture and keeping hot sandwiches at proper temperature, while overcoming or reducing many of the ecological problems. These three layer wraps comprise an absorbent inner layer, a foldable printable outer layer and a moisture vapor impermeable barrier layer in between wherein at least one of the interior or exterior layers are discontinuously bonded to the moisture vapor impermeable layer to form pockets which communicate with each other allowing flow of air between pockets defined between the layers by discontinuous bonding pattern. These wraps are effective in keeping many types of sandwiches warm while avoiding soggy spots on the bun.

U.S. Pat. No. 5,582,674 relates to a composite integral sheet of highly absorbent wrap material with hydrophobic water-vapor permeable pellicle and method of making the same. A composite integral sheet of wrap material which includes a first layer of absorbent material containing fibers bearing foraminous hydrophobic water-vapor-permeable pellicles, a second layer of printable material and an impermeable pigmented polymer layer interposed between the first and second layers. Additionally, the absorbent layer will include highly absorbent material formed by in-situ crosslinking of a partially pre-neutralized polyacrylic acid. The composite wrap material has a plurality of air pockets formed between at least one of the first or second layers and the polymer layer, by discontinuously bonding the first or second layers to the polymer material.

U.S. Pat. No. 6,197,380 relates to a paper having a melt-stable lactide polymer coating and process for manufacture thereof. A lactide polymer coating results in a strong, repulpable, high gloss, paper coating. The lactide polymer comprises a plurality of polylactide polymer chains, residual lactide in concentration of less than about 5 percent in water in concentration of less than about 2000 parts-per million. The patent also relates to a method for coating paper comprising extruding a lactide polymer composition onto a moving paper to provide a coated paper wherein the lactide polymer composition comprises; a lactide level of less than about 1 wt. % if any lactide present, a number average molecular weight of between about 10,000 and about 200,000; a catalyst comprising a ring opening polymerization catalyst; and catalyst deactivating agent in an amount sufficient to reduce catalytic depolymerization, relative to an absence of the catalyst deactivating agent.

U.S. Pat. No. 6,291,597 relates to a viscosity modified lactide polymer composition and process for the manufacture. The polylactide polymer is prepared by providing in the composition polylactide polymer molecules which have been modified, relative to linear non-substituted polylactide, to provide increased molecular interaction among polylactide backbone chains in the composition.

U.S. Pat. No. 6,093,791 relates to a melt-stable semicrystalline lactide polymer film and process for the manufacture. The lactide polymer comprises a plurality of polylactide polymer chains, residual lactide in concentration of less than about 5 percent and water in concentration of less than about 2000 parts per million.

U.S. Pat. No. 6,103,809 relates to a thermoplastic composition comprising at least one crystalline water sensitive polymer and at least one amorphous water sensitive polymer. The thermoplastic compositions are useful in a variety of applications wherein water or moisture sensitive thermoplastic materials are employed such as various packaging adhesive applications including case and carton sealing, remoistenable adhesives, repulpable/recyclable adhesives and multiwall bag applications. The invention is also useful for moisture activatable reinforcement strings and opening tapes for corrugated containers, as well as a variety of nonwoven applications such as body fluid impermeable barriers, core stabilization adhesives and construction adhesives.

U.S. Pat. No. 6,114,042 relates to biodegradable polymers, the production thereof and use thereof for producing biodegradable moldings.

U.S. Pat. No. 6,114,495 relates to a lactic acid residue containing polymer composition and product having improved stability and to methods for the preparation and use thereof. The lactic acid residue containing polymer preferably includes a polylactide polymer having a number average molecular weight of between about 25,000 and about 200,000, lactide, if present at all, present in a concentration of less than 0.5% wt % based on the weight of the composition, and deactivating agents. Articles which can be manufactured from the lactic acid residue containing polymer composition include fibers, coated paper, films, moldings and foam.

U.S. Pat. No. 5,852,166 relates to a lactide polymer coating resulting in a strong, repulpable, high gloss, paper coating. The lactide polymer comprises a plurality of poly (lactide) polymer chains, residual lactide in concentration of less than about 5 percent and water in concentration of less than about 2000 parts per million. A process for coating paper with the lactide polymer composition is also disclosed.

U.S. Pat. No. 5,736,204 relates to a compostable paperboard container and package for liquids which is coated with a material capable of degrading to carbon dioxide, water and biomass under composting conditions.

U.S. Pat. No. 6,312,823 relates to a compostable multilayer film which includes a core layer having a first surface and a second surface, a first blocking reducing layer covering the first surface of the core layer, and a second blocking reducing layer covering the second surface of the core layer. The core layer comprises a lactic acid residue containing polymer having a glass transition temperature below 20 degrees C. At least one of the first and second blocking reducing layers comprise a semicrystalline aliphatic polyester. The core layer may be peroxide modified polylactide polymer which exhibits bridging between polylactide polymer chains. The compostable multilayer structures are films having desirable properties of flexibility and tear resistance and can be used to provide disposable bags or wrappers.

U.S. Pat. No. 6,183,814 relates to coated grade polylactide and coated paper, preparations thereof and articles prepared therefrom. A coated paper product including a paper layer and a polymer layer, wherein the polymer layer includes a polylactide polymer composition having a ratio of Mz to Mn of greater than about 6. The polymer composition when melted, exhibits a die swell of greater than about 1.25 for a melt flow index of greater than about 2.

U.S. Pat. No. 6,153,306 relates to a paper coated with polylactide and a method for making it. The reference relates to a polylactide coated paper or board product which is made by coextrusion wherein the polylactide is extruded together with a conventional polymer, such as polyolefin, onto the surface of the paper, and after extrusion the polyolefin film is removed and recycled.

U.S. Pat. No. 5,925,726 relates to a thermoplastic biodegradable polyester, a process for the preparation thereof, and articles manufactured therefrom. The reference relates to a melt processible copolyester and a process and prepolymer for the preparation thereof. The copolymer contains structural units derived from a polyester and structural units derived from diepoxy, and the polyester units at least essentially consist of hydroxy acid monomers. The copolyester is hydrolytically degradable and it can be used as a biodegradable polymer for the manufacture of injection molded articles as well as thermoformed and blow molded packages, pouches, sacks and bottles, for the coating of sacks, bags and films made from paper or cardboard and for the preparation of fibers, fibre cloths and expanded polymer articles.

U.S. Pat. No. 5,936,045 relates to biodegradable polymers, the preparation thereof, and the use thereof for producing biodegradable moldings.

U.S. Pat. No. 6,075,118 relates to water responsive, biodegradable film compositions comprising polylactide and polyvinyl alcohol and a method for making the films. The films are useful as a component in flushable and degradable articles.

U.S. Pat. No. 6,080,478 relates to a multilayer material including a cellulose based naturally decomposing basic layer, at least one polyhydroxyalkanoate layer on the basic layer and at least one biodegradable polylactide layer between the basic layer and the at least one polyhydroxyalkanoate layer.

U.S. Pat. No. 5,540,962 relates to a compostable paperboard container and package for liquids coated with a polymeric material capable of degrading under composting conditions and subsequently in the presence of light to form carbon dioxide, water and biomass.

U.S. Pat. No. 5,665,474 relates to a lactide polymer coating resulting in a strong, repulpable, high gloss, paper coating. The lactide polymer comprises a plurality of polylactide polymer chains, residual lactide in concentration of less than about 5 percent and water in concentration of less than about 2000 parts per million. A process for coating the paper with the lactide polymer composition is also disclosed.

U.S. Pat. No. 5,807,973 relates to a nonwoven fabric comprised of a lactide polymer. The lactide polymer comprises a plurality of polylactide chains, residual lactide in concentration of less than about 2 percent and water in concentration of less than about 2000 parts per million. The patent also discloses a process for manufacturing a nonwoven fabric with the lactide polymer composition.

U.S. Pat. Nos. 5,849,374 and 5,849,401 relate to a compostable, multilayer structure in the form of a film, sheet, laminate, and the like, which comprises a core layer having a first surface and a second surface, a first blocking reducing layer covering the first surface of the core layer, and a second blocking reducing layer covering the second surface of the core layer. The core layer contains a lactic acid residue-containing polymer and has a glass transition temperature below about 20 degrees Celsius. The first and second blocking reducing layers include a polymer composition of a hydrolyzable polymer having a glass transition temperature above about 50 degrees Celsius. The multilayer structure can be used for preparing bags and wrappers.

SUMMARY OF THE INVENTION

The present invention relates to fast food, sandwich and burger wrappers, comprising two sheets of paper having a weight in the range of about 10 to 30 pounds laminated with polyethylene to form a paper/poly/paper structure. In the present invention PLA resin is substituted for the polyethylene, forming a paper/PLA/paper structure. The advantage of using PLA resin is the compostability of the wrapper, as well as its properties for retaining flavor/aroma and protecting against moisture.

Another object of the present invention is for PLA resin to coat a 10 to 30 pound paper substrate on one side with PLA resin, instead of polyethylene for fast food, sandwich and/or burger wrappers.

For gum wrappers, currently an 8 to 30 pound paper substrate is laminated to an extruded foil using polyethylene to create the single stick gum wrappers (paper/poly/foil lamination). In the present invention, PLA is substituted for polyethylene creating a paper/PLA/foil lamination.

Another object of the present invention is to use PLA resin as a substitute for polyethylene in an outside package for individually wrapped gum sticks whereby customers glue a printed film substrate to the paper/polyethylene/foil lamination. The advantage in using PLA in place of polyethylene for gum wrappers is its superior flavor and aroma retention (acting as an oxygen barrier) and moisture protection.

The present invention relates to a gum wrapper comprising; paper, PLA resin and foil; wherein the PLA resin is placed on an outside package of the gum wrapper for a printed film substrate to be placed on the paper/PLA/foil lamination.

The present invention relates to a wrapper for fast food, sandwich and burgers comprising; two sheets of paper having a weight in the range of about 10 to 30 pounds laminated with PLA resin, forming a paper/PLA/paper structure. It is an object of the present invention for the wrapper to be compostable. It is an object of the present invention for the wrapper to retain the flavor/aroma of contents of the wrapper. It is an object of the present invention for the wrapper to protect against moisture.

The present invention relates to a wrapper for fast food, sandwich and burgers comprising: a paper substrate having a weight in the range of about 10 to 30 pounds coated with a PLA resin on one side.

The present invention relates to a gum wrapper comprising; a paper substrate having a weight in the range of about 8 to 35 pounds laminated to an extruded foil using PLA to create a single stick gum wrapper (paper/PLA/foil lamination).

The present invention relates to an outside wrapper for individually wrapped gum sticks comprising; a paper substrate having a weight in the range of about 8 to 30 pounds laminated to an extruded foil using PLA to create an outside package for individually wrapped gum sticks whereby customers glue a printed film substrate to said paper/PLA/foil lamination. It is an object of the present invention for the wrapper to have superior flavor and aroma retention. It is an object of the invention for the wrapper to act as an oxygen barrier. It is an object of the present invention for the wrapper to provide moisture protection.

The present invention relates to a composite wrap material comprising; two layers or sheets of cellulosic material; and a layer of PLA resin interposed between the two cellulosic layers. It is an object of the present invention for the PLA layer to provide a moisture and vapor barrier to protect taste and aroma of a wrapped product. It is an object of the present invention for the wrapped product to be a fast food product, sandwich or burger. It is an object of the present invention for the wrap material to provide a clear or transparent wrap so that a consumer can see the paper layer laminated to the resin layer. It is an object of the present invention for the wrap material to have one or more layers containing a pigment to provide coloration.

The present invention relates to a method for making a composite wrap material comprising: laminating a three-layer structure comprising two layers of paper. A PLA layer or film layer is interposed between the paper layers using a nip roller apparatus or other suitable laminating device. The layers are then bonded together.

The present invention relates to a composite wrap material comprising: one layer or sheet of cellulosic material; and a layer of PLA resin material that is integrally bonded to the cellulosic material by means of an adhesive. It is an object of the present invention for the PLA resin layer to provide a moisture and vapor barrier to protect flavor and aroma of a food product packaged within the wrap material. It is an object of the present invention for the wrap material to provide a clear or transparent wrap such that a consumer can see the cellulosic material laminated to the PLA resin layer. It is an object of the present invention for the layers to contain a pigment to provide coloration. It is an object of the present invention for the cellulosic material to have a high gloss print surface or a standard paper print surface. It is an object of the present invention for the paper material and/or film/resin layer to have a metalized material. It is an object of the present invention for the paper to be printed before lamination so that the print shows through the film/resin layer. It is an object of the present invention for the wrap material to have a high burst strength. It is an object of the present invention for the wrap material to provide a moisture barrier to prevent moisture absorption. It is an object of the present invention for the wrap material to be compostable.

The present invention relates to a composite wrap material comprising: a layer of paper or cellulosic material; and two or more layers of different resins simultaneously applied to one side of said paper. One resin has a low moisture transmission rate and/or high strength characteristics and the other resins having heat seal or glueable characteristics similar to polyethylene coated wraps. It is an object of the present invention for the one resin to comprise a layer of polypropylene homopolymer or copolymer, high density polyethylene, PLA, or linear low density polyethylene which provides higher strength characteristics and lower moisture vapor transmission rates, and the other resin comprises low density polyethylene, or PLA which provides a heat seal or glueable surface.

The present invention relates to a process for making a composite material comprising: providing a first sheet of cellulosic material and a second coextruded layer comprising two layers of polymer and/or PLA resin materials. The coextrusion layer are applied to a surface of the first sheet. The first sheet and the second coextrusion layers are conveyed into a laminating apparatus where said layers are bonded, forming an integral composite material.

The present invention relates to a wrap for fast food items, sandwiches, and/or burgers comprising: first and second cellulosic layers comprising a printed or non-printed paper substrate with a basis weight of 10 to 30 pounds per 3,000 sq. ft; and a layer of PLA resin interposed between the cellulosic layers. It is an object of the present invention for the PLA resin to be in an amount necessary to provide adequate moisture and vapor protection and optimal retention of flavor and aroma of a wrapped food product.

The present invention relates to a wrap for fast food items, sandwiches, and/or burgers comprising; a first cellulosic layer comprising a printed or non-printed paper substrate with a basis weight of 10 to 30 pounds per 3,000 sq, ft; and a layer of PLA resin coated on the cellulosic layer. It is an object of the present invention for the PLA resin to be in an amount necessary to provide adequate moisture and vapor protection and optimal retention of flavor and aroma of a wrapped food product. It is an object of the present invention for the wrap to further comprise an adhesive.

The present invention relates to a wrap for wrapping individual sticks of chewing gum comprising: a first cellulosic layer comprising a paper substrate with a basis weight of approximately 8 to 30 pounds per 3,000 sq. ft. The paper layer is laminated to a layer of extruded foil using PLA resin as an interposing layer.

The present invention relates to an outside wrapper for packaging a specified quantity of individually wrapped sticks of chewing gum comprising: a first cellulosic layer comprising a paper substrate with a basis weight of 10 to 35 pounds per 3,000 sq. ft. The paper layer is adhered to a printed solid plastic film substrate using PLA resin interposed therein between.

DESCRIPTION OF THE PREFERRED EMBODIMENTS

Figure 1:
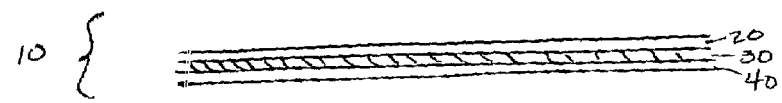
FIG. 1 is a cross-sectional view of a three-layered structure used for wrapping fast food items, sandwiches, or burgers.

In one embodiment a composite wrap material comprises two layers or sheets of cellulosic material and a layer of PLA resin that is interposed between the two cellulosic layers. The PLA layer functions to provide a moisture and vapor barrier to protect the taste and aroma of the wrapped product, such as a fast food product, sandwich or burger. The wrap material can provide a clear or transparent wrap such that the consumer can see the paper layer laminated to the resin layer. One or more layers can optionally contain a pigment to provide coloration. The composite paper/PLA/paper material can be prepared by laminating a three-layer structure comprising one layer of paper, the PLA layer or film layer interposed between the first and a second paper layer using a nip roller apparatus or other suitable laminating device. The paper and resin layers can be passed through a pair of nip rollers to bond the layers together. Advantageously, the resulting composite wrap facilitates high burst strength of the final package, the option of a high gloss print surface or a standard paper print surface, a moisture barrier to prevent moisture absorption by the wrapped paper and the fold characteristics of paper. The composite wrap material is also fully compostable.

In a further embodiment, the present invention relates to a composite wrap material comprising one layer or sheet of cellulosic material and a layer of PLA resin material that are integrally bonded together by means of an adhesive. The PLA resin layer functions to provide a moisture and vapor barrier to protect the flavor and aroma of the food product packaged within the wrap material. The wrap material can provide a clear or transparent wrap such that a consumer can see the paper layer laminated to the PLA resin layer. One or more layers can optionally contain a pigment to provide coloration. The wrap can also be provided with a high gloss print surface or a standard paper print surface. The paper material and/or film/resin layer can be a metalized material. Also the paper can be printed before lamination so that the print shows through the film/resin layer.

Advantageously, the resulting composite wrap facilitates high burst strength of the final package, the option of a high gloss print surface or a standard paper print surface, a moisture barrier to prevent moisture absorption. The composite wrap material is also compostable.

In a further embodiment, the present invention relates to a composite wrap material comprising a layer of paper or cellulosic material and a layer of coextruded resin. The coextrusion process comprises applying two or more layers of different resins simultaneously to one side of the paper. The composite wrap material has one resin with low moisture transmission rates and/or high strength characteristics and the other resin has heat seal or glueable characteristics similar to the polyethylene coated wraps currently used in the market.

The inside coextrusion layer comprises a layer of polypropylene homopolymer or copolymer, high density polyethylene, PLA, or linear low density polyethylene which provides higher strength characteristics and lower moisture vapor transmission rates. The outside layer may comprise low density polyethylene, or PLA which provides a heat seal or glueable surface.

In an embodiment, the present invention relates to a process for making a composite material comprising: providing a first sheet of cellulosic material and a second coextruded layer comprising two layers of polymer and/or PLA resin materials. The coextrusion layers are applied to the surface of the first sheet. The first sheet and the second coextrusion layers are conveyed into a laminating apparatus where the layers are bonded to form an integral composite material.

FIG. 1 depicts an embodiment of the invention (10) used for wrapping fast food items, sandwiches, and/or burgers. The first and second cellulosic layers (20 and 40) comprise a printed or non-printed paper substrate with a basis weight of 10 to 30 pounds per 3,000 sq. ft. Interposed between layers (20) and (40) is a layer of PLA resin (30) in an amount necessary to provide adequate moisture and vapor protection and optimal retention of flavor and aroma of the wrapped food product. The three layers are integrally bonded using a lamination process whereby the layers are directed through a pair of nip rollers rotating in opposite directions.

Figure 2:
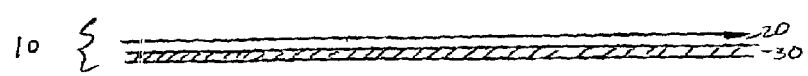
FIG. 2 is a cross-sectional view of a two-layered structure used for wrapping fast food items, sandwiches, or burgers.

FIG. 2 depicts an embodiment of the invention (10) used for wrapping fast food items, sandwiches, and/or burgers. The first cellulosic layer (20) comprises a printed or non-printed paper substrate with a basis weight of 10 to 30 pounds per 3,000 sq, ft. The paper layer is coated by any known means with a layer (30) of PLA resin in an amount necessary to provide adequate moisture and vapor protection and optimal retention of flavor and aroma of the wrapped food product. The paper may be extruded or otherwise coated with a layer of PLA resin or laminated to a PLA resin film with or without the use of any known adhesive.

Figure 3:
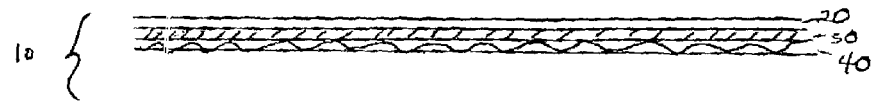
FIG. 3 is a cross-sectional view of a wrapper used for wrapping individual sticks of chewing gum.

FIG. 3 depicts an embodiment of the invention (10) used for wrapping individual sticks of chewing gum. The first cellulosic layer (20) comprises a paper substrate with a basis weight of approximately 8 to 30 pounds per 3,000 sq. ft. The paper layer (20) is laminated to a layer of extruded foil (40) using PLA resin (30) as an interposing layer.

Figure 4:
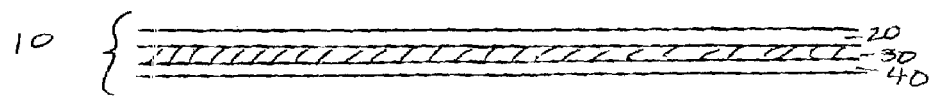
FIG. 4 is a cross-sectional view of an outside wrapper used for packaging a specified quantity of individually wrapped sticks of chewing gum.

FIG. 4 depicts an embodiment of the invention (10) used as an outside wrapper for packaging a specified quantity of individually wrapped sticks of chewing gum. The first cellulosic layer (20) comprises a paper substrate with a basis weight of 10 to 35 pounds per 3,000 sq. ft. The paper layer (20) is adhered to a printed solid plastic film substrate (40) using PLA resin (30) interposed therein between.

What is claimed is:

1. A composite wrap material, comprising:
   two layers each comprising cellulosic material; and
   a layer of polylactide (PLA) resin interposed between said two layers.

2. The composite wrap material of claim 1 wherein said layer of polylactide (PLA) resin interposed between said two layers comprises a moisture and vapor barrier to retain taste and aroma of a product to be wrapped by the composite wrap material.

3. The composite wrap material of claim 1 wherein said wrap material comprises one or more layers containing a pigment to provide coloration.

4. A method for making a composite wrap material, comprising;
   interposing a polylactide (PLA) resin layer between two paper layers; and
   bonding said layers together by passing the same through a laminating apparatus.

5. The method of claim 4 wherein bonding said layers together comprises passing the same through nip rollers of the laminating apparatus.

6. A wrap for wrapping food items, comprising:
   first and second cellulosic layers comprising a printed or non-printed paper with a basis weight of 10 to 30 pounds per 3,000 square feet; and
   a layer of polylactide (PLA) resin interposed between said cellulosic layers.

* * * * *